United States Patent [19]

Dexheimer et al.

[11] Patent Number: 4,468,478

[45] Date of Patent: Aug. 28, 1984

[54] POLYURETHANES PREPARED FROM POLYOXYALKYLENES CONTAINING ALKALINE CATALYST RESIDUES CHELATED WITH BENZOIC ACID DERIVATIVES

[75] Inventors: Edward M. Dexheimer, Grosse Ile; Michael J. Anchor, Canton Township; Basil Thir, Grosse Ile; Stephen E. Eisenstein, Oak Park, all of Mich.

[73] Assignee: BASF Wyandotte Corporation, Wyandotte, Mich.

[21] Appl. No.: 541,884

[22] Filed: Oct. 14, 1983

Related U.S. Application Data

[62] Division of Ser. No. 311,668, Oct. 15, 1981, Pat. No. 4,426,301.

[51] Int. Cl.$^3$ .................... C08G 18/14; C08G 18/28
[52] U.S. Cl. .................... 521/125; 521/174; 525/125; 525/453; 525/454; 525/460; 528/57; 528/67; 528/77; 528/78; 528/79
[58] Field of Search .............. 252/89, 52 A; 528/57, 528/76, 77, 78, 79; 521/125, 174; 525/125, 453, 454, 460

[56] References Cited

U.S. PATENT DOCUMENTS 4,426,300 1/1984 Dexheimer et al. ............ 252/8.9
4,426,301 1/1984 Dexheimer et al. ............ 252/8.9

Primary Examiner—Lester L. Lee
Attorney, Agent, or Firm—David L. Hedden; Joseph D. Michaels

[57] ABSTRACT

The oxidation promoting harmful effects of the presence of an alkaline catalyst in a polyoxyalkylene can be eliminated and the product made more resistant to oxidation especially at elevated temperatures by the incorporation therein of soluble salts of certain benzoic acid derivatives. The soluble salts can be formed by reaction with the alkali or alkaline earth metal ion derived from the alkaline catalyst utilized in the polymerization of the polyoxyalkylene.

8 Claims, No Drawings

POLYURETHANES PREPARED FROM POLYOXYALKYLENES CONTAINING ALKALINE CATALYST RESIDUES CHELATED WITH BENZOIC ACID DERIVATIVES

This is a division of application Ser. No. 311,668, filed Oct. 15, 1981 now U.S. Pat. No. 4,426,301.

BACKGROUND OF THE INVENTION

1. Field of the Invention

This invention relates to polyoxyalkalenes made by polymerizing at least one alkylene oxide in the presence of an initiator and a basic catalyst.

2. Description of the Prior Art

Login in U.S. Pat. No. 4,118,326 discloses that a polyoxyalkylene can be neutralized with a saturated carboxylic acid containing up to 18 carbon atoms subsequent to polymerization of alkylene oxides with an active hydrogen-containing initiator in the presence of an alkaline catalyst such as potassium hydroxide. Instead of removing the alkaline catalyst residue remaining subsequent to polymerization of the polyoxyalkylene, formation of the salt with the above saturated carboxylic acid provides improved oxidation stability when the polyoxyalkylene is utilized as a spin-finish lubricant for processing synthetic fibers.

Newkirk et al in U.S. Pat. No. 4,110,227 disclose lubricants for synthetic fibers such as polyester and nylon which are oxidation-stable polyoxyalkylene compounds. The polyoxyalkylenes are initiated utilizing a difunctional phenol as an active hydrogen-containing compound. The presence of the phenolic initiator compound residue in the chain of the polyoxyalkylene provides improved heat stable polyoxyalkylene lubricants.

Brenkman et al in U.S. Pat. No. 3,365,402 disclose a process for eliminating the harmful effects of an alkaline catalyst in a capillary-active product (polyoxyalkylene). Catalyst ions remaining after the polymerization of the polyoxyalkylene are neutralized with a laurylpolyoxyethylene acetic acid. Such a product is chosen so as to provide compatibility with the polyoxyalkylene main product and so as not to impair the properties of the main product.

Mago in U.S. Pat. No. 4,263,167 discloses that an effective amount of the sodium salt of salicylic acid is a good oxidation inhibitor for poly(alkylene oxide) present at 10 percent aqueous concentration when exposed to a temperature of 70° C. for 8 days but was not a good corrosion inhibitor for steel. Methylene or sulfur-bridged hydroxyl-substituted aromatic carboxylic acids are both oxidation inhibitors for poly(alkylene oxides) and good corrosion inhibitors for steel.

It has been the practice generally to neutralize the residue of the alkaline catalyst utilized in the preparation of polyoxyalkylenes. Inorganic acids have been added so as to form soluble salts or precipitates which are subsequently filtered out so as to remove alkali or alkaline earth metal ions. In those cases where the inorganic acid utilized forms soluble salts with the alkaline catalyst, for instance potassium phosphate, it has been found possible to utilize the neutralized polyols in the preparation of certain types of polyurethanes. Alternatively, the prior art use of adsorbents such as magnesium silicate in the presence of water followed by filtration provides a means of removal of the metal ions derived from the alkaline catalyst. It remains to this date industry practice to remove the metal ion residue of the alkaline catalyst from a polyoxyalkylene to the extent that no more than about 5 ppm of alkali or alkaline earth metal ion remains.

Common approaches to the removal of the alkaline catalyst have been adsorption on magnesium silicate or the neutralization of the alkaline catalyst with an inorganic acid which forms a precipitate and the subsequent removal of the precipitate or the magnesium silicate by filtration. Various other means of removal of the alkaline catalyst have been proposed such as dilution of the polyoxyalkylene with a water insoluble solvent and the subsequent washing of the solvent solution with water. Another approach has been the use of ion exchange columns for the removal of catalyst from low viscosity polyoxyalkylenes. A further approach is the neutralization of the alkaline catalyst with carbon dioxide, and the subsequent removal of water under reduced pressure with the subsequent removal of the alkali carbonate formed by filtration.

SUMMARY OF THE INVENTION

The use of certain benzoic acid derivatives which form soluble salts with certain metal ions to neutralize the alkaline catalyst remaining subsequent to the polymerization of a polyoxyalkylene provides a means of improving the oxidation stability of a polyoxyalkylene or mixture thereof. Such improved oxidation stable polyoxyalkylenes are useful particularly as lubricants for synthetic fibers.

The neutralized polyoxyalkylenes also can be used in the preparation of urethanes. The polyoxyalkylenes find use, for instance, in the preparation of solid, non-cellular polyurethanes and in the preparation of rigid and flexible polyurethane foams.

DESCRIPTION OF THE PREFERRED EMBODIMENTS

There are disclosed improved oxidation stable polyoxyalkylene compounds which are useful either alone or in admixture with prior art, oxidation-susceptible polyoxyalkylene compounds especially as lubricants for synthetic textile fibers or in the preparation of polyurethanes. Lubricants are required to be applied to a textile fiber subsequent to spinning to reduce the tendency towards breakage of the individual filaments as they are subjected subsequently to various mechanical strains. These lubricants function to enable satisfactory handling of such fibers as nylon and polyester in processing applications such as spinning, twisting, winding, reeling, drafting, weaving, carding, combing, knitting, and throwing, and are particularly suitable for use in the production of a synthetic fiber continuous filament, false twist, textured yarn, as well as other type yarns.

The improved oxidation stable polyoxyalkylene compounds of the invention are also useful in the preparation of polyurethanes where generally heretofore polyoxyalkylenes used to react with organic polyisocyanates were required which are substantially free of alkaline catalysts residues used in the preparation of the polyoxyalkylene. The polyoxyalkylenes of the invention containing a soluble salt which is the reaction product of the catalyst used to prepare the polyoxyalkylene with certain derivatives of benzoic acid can be reacted to form cellular or homogeneous polyurethane products. The heretofore undesirable action, during the formation of the polyurethane, of the strongly basic inorganic catalyst utilized in the preparation of the polyoxyalklene is overcome in accordance with the invention by neutralization with certain benzoic acid derivatives. The alkali or alkaline earth metal ion present will no longer substantially catalyze side reactions such as the polymerization of isocyanate groups thus rendering the control of polyurethane-forming reactions difficult. Surprisingly, the soluble salt formed by reaction with certain benzoic acid derivatives is, at most, only a mild catalyst for the isocyanate active hydrogen reaction or for the undesirable side reactions of isocyanate group polymerization.

By neutralizing the alkaline catalyst residues present at the end of the preparation of a polyoxyalkylene with the benzoic acid derivatives of the invention there is avoided the time-consuming and energy-wasteful processes of water-washing a water-insoluble solvent solution of the polyoxyalkylene, adsorbing the metal ions with magnesium silicates, or forming a precipitate with an inorganic acid and filtering the magnesium silicate or the inorganic acid salt precipitate out of the polyoxyalkylene. Oftentimes the higher molecular weight materials require a filtration operation at elevated temperatures so as to speed the process. To improve oxidation stability, alkali or alkaline earth metal salts of the benzoic acid derivatives of the invention can also be added to polyoxyalkylenes from which catalyst residues have been substantially removed.

According to the invention, polyoxyalkylenes having improved oxidation stability can be prepared by neutralizing the alkaline catalyst residues remaining subsequent to polymerization with at least one of a benzoic acid derivative having the formulas:

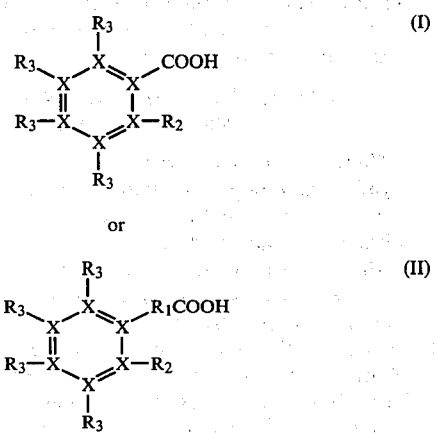

wherein $R_1$ is selected from the group consisting of alkyl and alkenyl of up to 6 carbon atoms; $R_2$ is selected from the group consisting of hydroxyl, an alkyl ether residue having up to 4 carbon atoms, an hydroxy alkyl ether residue having up to 4 carbon atoms, an alkenoxy or oxyalkanoic acid ester residue having up to 18 carbon atoms and benzoyl; $R_3$ is individually selected from the group consisting of hydrogen, alkyl ether residues having up to 4 carbon atoms, hydroxy alkyl ether residues having up to 4 carbon atoms, alkyl or alkenyl residues of up to 6 carbon atoms, halogen, and carboxyl groups; and X is selected from the group consisting of (1) carbon and (2) carbon together with at least one of nitrogen, sulfur and oxygen.

The novel lubricants of the invention contain alkali or alkaline earth metal salts or mixtures thereof of the benzoic acid derivatives of formulas I and II. The proportion of these salts present in the polyoxyalkylene compound depends upon the amount of catalyst remaining after polymerization. The original starting proportion of the catalyst can be about 0.002 to about 10.0 percent by weight, preferably from 0.01 to 5.0 percent by weight and most preferably about 0.01 to about 1.5 percent by weight, all based upon the total weight of the final product. As is conventional, higher proportions of catalyst and low reaction temperatures are used where high molecular weight polyoxyalkenes are desired. Conversely, where low molecular weight polyoxyalkylenes are desired, low catalyst proportions are utilized at moderate to high polymerization temperatures. As polymerization progresses, the catalyst is diluted by the addition of alkylene oxide so that as little as ½ to 1/10 of the original catalyst remains. Both organic and inorganic catalysts can be used to prepare polyoxyalkylenes. Conventional organic catalysts for the preparation of polyoxyalkylenes are alkali metal alkylates having from 1 to 4 carbon atoms in the alkyl radical, such as sodium and potassium methylate, sodium and potassium ethylate, potassium isopropylate and sodium butylate. Inorganic catalysts such as alkali metal hydroxides and alkaline earth metal hydroxides can be used. Preferably, alkali metal hydroxides such as sodium hydroxide and most preferably potassium hydroxide are used.

Representative examples of benzoic acid derivatives under formulas I and II are salicylic acid (orthohydroxybenzoic acid), ortho-hydroxycinnamic acid, 2-(parahydroxybenzoyl) benzoic acid, and acetylsalicylic acid.

The preparation of polyoxyalkylenes is otherwise in accordance with conventionally known procedures. For instance, alkylene oxides having up to 4 or with from 2 to 4 carbon atoms are generally added to initiator compounds in the presence of basic catalysts. Suitable alkylene oxides include ethylene oxide; 1,2-propylene oxide; 1,2-butylene oxide; 1,3-butylene oxide and tetrahydrofuran. Alternatively, aromatic substituted alkylene oxides having 2 to 4 aliphatic carbon atoms can be used, such as styrene oxide, and both aliphatic and aromatic substituted glycidyl ethers having 2 to 4 aliphatic carbon atoms such as tertiary-butyl glycidyl ether or phenyl glycidyl ether can be used. Preferably ethylene oxide, mixtures of ethylene oxide and 1,2-propylene oxide, or 1,2-propylene oxide are utilized in the preparation of the polyoxyalkylenes of the invention. The alkylene oxides can be polymerized so as to form heteric or block copolymers or combinations of heteric and block copolymers by appropriate procedures known in the art. The polyoxyalkylenes are generally reacted with an initiator compound in the preparation thereof having one or more reactive hydrogen atoms. Illustrative of such initiator compounds are water, aliphatic mono-, di-, or polyhydric alcohols, for instance, methyl alcohol, ethyl alcohol, propyl alcohol, butyl alcohol, hexyl alcohol, octyl alcohol, ethylene glycol, propylene glycol, diethylene glycol, dipropylene glycol, triethylene glycol, tripropylene glycol, glycerol, hexanetriol, pentaerythritol, sorbitol, trimethylol propane; aliphatic or aromatic mono-, di- or triamines, e.g., stearylamine, ethylenediamine, diethylenetriamine, hexamethylenediamine, phenylenediamine; aliphatic compounds having amino and hydroxyl groups, e.g., ethanolamines, propanolamines; aliphatic compounds having a mercapto group, e.g., dodecylmercaptan, 2,3-dimercapto-1-propanol; and aromatic compounds having one or more hydroxyl groups, e.g., nonyl phenol, 1,1,3-tris(p-hydroxyphenyl) propane, 1,1,2,2,-tetrakis(p-hydroxyphenyl) propane, and 4,4'-isopropylidenediphenol.

In detail, the polyoxyalkylenes are manufactured by reacting a mixture of initiator compound and basic catalyst at temperatures of from 90° C. to 150° C., preferably 100° C. to 130° C., with at least one alkylene oxide at such a rate that the alkylene oxide is taken up by the reaction mixture in approximately 2 to 30 hours, preferably about 5 to 10 hours at atmospheric pressure, or as the case may be, under higher pressures of about 1 to 20 atmospheres, preferably about 1 to 5 atmospheres pressure. The alkylene oxide can be diluted with inert gas, for instance nitrogen and usually the alkylene oxide is added to the reaction mixture during the course of the reaction. Where mixed alkylene oxides are reached, heteric polymers are produced. Successive addition of different alkylene oxides produce block polymers. After completing the polymerization reaction, any unreacted alkylene oxide is removed by stripping under reduced pressure and at temperatures of from 100° C. to 150° C., the polyoxyalkylene is treated with the benzoic acid derivative of the invention at temperatures of from 20° C. to 150° C., preferably at temperatures of from 40° C. to 100° C. The reaction mixture is thereafter stirred from 0.5 to 20 hours, preferably from 1 to 5 hours, after which time the reaction vessel is vented, and volatile side products are stripped off under reduced pressure at temperatures between 50° C. and 150° C.

The polyoxyalkylenes of the invention are more economical to prepare than those polyoxyalkylenes of the prior art having substantially no catalyst remaining in the polyol as the result of the substantially complete removal of the alkaline catalyst ions. One reason for the prior art removal of the catalyst remaining in a polyoxyalkylene subsequent to polymerization is the fact that presence of catalyst tends to accellerate the degradation of the polyoxyalkylene upon subsequent exposure to air and elevated temperatures. Another reason for the prior art removal of the catalyst residues is the effect of the catalyst upon the reaction of an organic polyisocyanate with the polyoxyalkylene. The presence of a strongly basic inorganic catalyst is undesirable in such polymerizations since its presence can cause undesirable side-reactions such as the polymerization of the isocyanate groups, and since the remaining catalyst also is a catalyst for the reaction of isocyanate groups with active hydrogen atoms (present in the polyoxyalkylene). Thus the control of the polyurethaneforming reaction is made more difficult.

Unexpectedly, it has been found that the benzoic acid derivative salts of the metal ion of the alkaline catalyst used in the preparation of polyoxyalkylenes provides improved oxidation stability in the polyoxyalkylenes in which it is present, and that in this salt the metal ion is so firmly bound that its interference in polyurethane-forming reactions is minimal. The use of such oxidation stabilized polyoxyalkylenes thus overcomes the wasteful energy- and time-consuming processes involved in purification processes such as the filtration and removal by adsorption of the alkaline catalyst residues from the polyoxyalkylenes. Because of the substantial reduction in processing time as well as energy costs related to the adsorption, washing, or filtration steps utilized in prior art polyoxyalkylene processes, the oxidation stable polyoxyalkylenes of the invention are more economical to manufacture as well as superior in oxidation stability to the polyoxyalkylenes of the prior art.

Graft copolymer dispersions comprising a polyoxyalkylene and grafted vinyl polymer and their use in the preparation of polyurethanes are well known in the art. These are disclosed in U.S. Pat. No. 3,383,351 to Stamberger, U.S. Pat. No. 3,652,639 and U.S. Re. No. 29,014 both to Pizzini et al, all of which are incorporated herein by reference. Preferably the grafted vinyl polymer is derived from a mixture of acrylonitrile and styrene which are reacted with an unsaturated polyol containing from 0.10 mole to 0.70 mole of unsaturation per mole of polyol.

The oxidation stabilizer of this invention can be employed together with known stabilizers, e.g., butylhydroxy-anisol, dibutyl-hydroxy-toluene, 2-α-alkylcycloalkyl-4,6-dimethylphenol, bis(2-hydroxy-3-α-alkyl-cycloalkyl-5-methylphenyl) methane, mono- or dialkylphenol, mono- or dialkyl biphenol, mono- or dialkyl cresol, methylene-bis((alkylphenol)), mono- or dialkyl hydroquinone, hydroquinone, tris(alkylbenzyl)-phenol, etc. In such a case, the effect on the stabilization of polyoxyalkylene polyol increases synergistically in general.

The quantity of the soluble salt of this invention, which can exhibit a stabilizing effect on the polyoxyalkylene is about 0.01–1 percent by weight relative to the polyoxyalkylene to be stabilized, preferably about 0.05–0.5, and most preferably about 0.01 to about 0.1 percent by weight is used. However, this value is not restrictive and any quantity of more than 1 percent of the soluble salt of this invention relative to the polyoxyalkylene can be employed in the method of the invention with satisfactory results. Generally the use of less than about 0.01 percent of the soluble salt of this invention is not effective in stabilizing a polyoxyalkylene or mixture thereof. When the stabilizer of this invention is employed together with known stabilizer(s), the quantity of the stabilizer of this invention may be the same as that of the added known stabilizer(s), or more or less than that of the added known stabilizer(s). The total quantity of the stabilizer of this invention and the added known stabilizer(s) can generally be about 0.05 to about 1 percent preferably about 0.05 to about 0.5 percent by weight relative to the polyoxyalkylene. In general the ratio of the amount of the stabilizer of this invention relative to that of known stabilizers is generally about 10 to 100 to about 100 to 100.

The addition of the benzoic acid derivative to the polyoxyalkylene can be carried out conveniently in a variety of ways. The addition of the benzoic acid derivative of the invention can be made in a solid state, that is by adding the acid directly to the polyoxyalkylene upon the conclusion of the polymerization process so as to neutralize the alkaline catalyst used in the preparation thereof. The benzoic acid derivative can also be added to the polyoxyalkylene as a solution in which it is dissolved in a suitable solvent such as a $C_1$–$C_4$ alkyl alcohol, a $C_2$–$C_4$ alkyl ether, or an aromatic hydrocarbon such as toluene. The addition can be carried out subsequent to the polymerization process with just enough or a slight excess of the benzoic acid derivative of the invention being added so as to neutralize the alkaline catalyst residue. When the benzoic acid derivative is added to the polyoxyalkylene directly, i.e., in a solid form and not in a solution in a solvent, it is especially important to insure that the benzoic acid derivative of the invention is mixed thoroughly into the polyoxyalkylene to dissolve the benzoic acid derivative and to insure uniformity in the polyoxyalkylene.

Where conventional aromatic based oxidation stabilizer compounds are added to the polyoxyalkylene together with the benzoic acid derivative of this invention, or in a situation where two or more kinds of the benzene derivatives of this invention are added to the polyoxyalkylene, the addition of the benzoic acid derivative is preferably carried out first to avoid adversely affecting aromatic-based oxidation inhibitors. Polyoxyalkylenes stabilized against oxidation utilizing at least one of the benzoic acid derivatives of the invention, alone or in combination with known stabilizers, are effectively inhibited against degradation or decomposition of the polyoxyalkylene, as indicated by an increase in the acid value, decrease in viscosity, or other indication of degradation or decomposition of polyoxyalkylenes well known to those skilled in the art.

Conventional polyoxyalkylenes are readily subject to degradation or decomposition when exposed for any considerable length of time to the air or the action of ultraviolet rays, and this degradation or decomposition is enhanced by exposure to elevated temperatures. When polyoxyalkylenes are heated in air, they undergo a remarkable decrease in weight, apparently due to the formation of degradation or decomposition products in the form of lower molecular weight compounds which are relatively volatile and evaporate readily into the air. Even where polyoxyalkylenes are kept at room temperature in air for some time, such as 10–20 days or longer, an aldehyde-like or dioxane-like odor often develops. The degraded polyoxyalkylenes give a positive reaction to fuchsin-aldehyde reagent whereas the undecomposed polyoxyalkylenes give neither an aldehyde-like odor nor a positive reaction to fuchsin-aldehyde reagent.

It is believed that the oxidation of polyoxyalkylenes is accompanied by the formation of carbonyl compounds, peroxides and acids, and the manifestation of such deterioration is formation of color. Often, a decrease in viscosity and the formation of volatile by-products as indicated by fuming of the composition at elevated temperatures occurs. The tendency of textile lubricants to fume upon use at elevated temperature is commonly used as an indication of the oxidation stability of the lubricant. It is therefore common to evaluate the oxidation stability of such products by thermogravimetric analysis. In such a method, the loss in weight after heating at elevated temperatures provides a clear indication of the susceptiblity of the polyoxyalkylene to oxidation at elevated temperatures.

More specifically, the polyoxyalkylene compounds of the invention useful as fiber lubricants are those which are either homopolymers or copolymers having regularly repeating monomer units or segregated "blocks" of different structure in the polymer chain or heteric copolymers. The molecular weight of such polyoxyalkylenes is about 300 to about 12,500, preferably about 300 to about 2,000. The weight ratio of ethylene oxide utilized in comparison with the other lower alkylene oxides such as 1,2-propylene oxide or butylene oxide is generally about 90:10 to about 10:90, preferably about 80:20 to about 20:80, and most preferably about 75:25 to about 50:50. It is desirable for certain embodiments of the fiber lubricant polymers of the invention to maintain a ratio of ethylene oxide to other lower alkylene oxides in order that the dispersibility of the lubricant in water will be suitable for the lubricating use intended. However, additional emulsifiers also can be utilized in the lubricant composition to provide suitable dispersibility of the alkylene oxide. As is well known, a textile fiber lubricant composition generally is required to have excellent scourability so as to allow easy removal of the lubricant subsequent to processing of the yarn.

Generally the polyoxyalkylene lubricants are applied to the synthetic textile fiber alone or in mixtures with prior art fiber lubricants. At least 25 percent by weight of the mixture is the oxidation-stable polyoxyalkylene of the invention. The lubricants are applied to the fiber at temperatures of about 25° C. to about 70° C. simply by drawing fiber through a bath of a lubricant with or without diluting water. Water dispersibility or solubility of the lubricants of the invention can be provided by appropriate levels of ethylene oxide utilized in the preparation thereof. Such water dispersibility or solubility not only permits east of application but ease of removal of the lubricants from fibers subsequent to processing. Under typical conditions, the amount of lubricant on the fiber, on the basis of the weight of the fiber, is generally an effective lubricating amount up to about 4 percent by weight, preferably about 0.5 percent to about 1.5 percent by weight, of lubricant based on the weight of the fiber. Where the lubricant is dispersible or soluble in water, the simple expedient of diluting the lubricant with water to the required concentration permits variations in the amount of lubricant to be applied to the fiber.

The preferred polyester fibers are produced from the linear terephthalate polyesters, that is, the polyesters of a glycol containing from 2 to about 20 carbon atoms and a dicarboxylic acid component containing at least about 75% terephthalic acid. The remainder, if any, of the dicarboxylic acid component may be any suitable dicarboxylic acid such as sebacic acid, adipic acid, isophthalic acid, sulfonyl 4,4'-benzoic acid or 2,8-dibenzofuran dicarboxylic acid. The glycols used can contain 2 or more carbon atoms in the chain, for instance, ethylene glycol, diethylene glycol, butylene glycol, decamethylene glycol and bis(1,4-hydroxy methyl) cyclohexane. Examples of linear, terephthalate polyesters which can be employed include poly(ethylene terephthalate) and poly(butylene terephthalate).

Any suitable nylon polymer which provides high tenacity yarn can be utilized in combination with the lubricants of the invention to produce false twist or high bulk yarn. The preferred nylon fibers are those produced from the following polymers: poly(hexamethylene adipamide) and poly(caprolactam).

Utilization of the fiber lubricants of the invention can be in any conventional spin-drawing process or in a separate drawing process available in the prior art. The treatment of the synthetic fibers with the fiber lubricants of the invention can be effected by any method practiced in the prior art to provide lubrication. Usually, the treating agent of the invention is applied to the fibers as an aqueous emulsion having a concentration of 2 to 30% by weight. Sufficient lubricity is obtained with a dry weight add-on of the treating lubricant of usually about 0.05% to about 3.0%, preferably about 0.2% to about 1.0%, by weight based upon the weight of the thermoplastic, synthetic fibers. The temperature to which the fibers are exposed usually ranges from about 150° C. to about 270° C., preferably at least about 200° C. The fiber lubricants of the invention provide especially satisfactory lubrication and resistance to oxidation upon exposure over the temperature range of about 200° C. to about 230° C.

In addition to their use as textile lubricants, the polyoxyalkylenes neutralized with the benzoic acid derivative of the invention are useful as surface active agents, hydraulic fluids, and in the manufacture of solid, noncellular polyurethanes and rigid, semi-rigid, and flexible polyurethane foams. While it is conventional to supply polyoxyalkylenes for use in preparation of polyurethane foams and solid polyurethanes, which are substantially free of catalyst metal ion (containing up to about 5 ppm), the oxidation stable polyoxyalkylenes of the invention have been found to be useful organic compounds having active hydrogen atoms, as determined by the Zerewitinoff method, for use in the preparation of such polyurethanes as well as in the preparation of polyurethane prepolymers.

In the evaluation of the thermostability of the polyoxyalkylene lubricants of the invention, a so-called "Pan Test" is generally utilized by the fiber industry. In this method, triplicate 3 gram samples of polyoxyalkylene-containing fiber lubricants are placed in 2 inch diameter aluminum weighing dishes in a circulating air oven or on a hot plate, heated to about 240° C. The weight of the polyoxyalkylene remaining in the pan is determined periodically. At the end of the test, the color and water solubility of the remaining polyoxyalkylene, or residue thereof, are noted. The solubility of the polyoxyalkylene at the end of the test is an important criteria for a useful fiber lubricant since the lubricant must be washed off the texturizing equipment, on which it is deposited during fiber processing, at regular intervals to eliminate buildup of deposits.

Evaluation of the oxidation stabilized polyoxyalkylenes of the invention in the preparation of polyurethanes was conducted by the preparation of free rise, flexible polyurethane foams using water as a blowing agent, rigid polyurethane foams, and rigid, non-cellular polyurethane castings. Appearance of the flexible foam, rise time, foam height and foam weight of the flexible foam prepared utilizing a graft polyol containing potassium salicylate were compared with a similar formulation made utilizing a polyol substantially free of catalyst residues (that is, containing less than 0.5 ppm).

The following examples illustrate the various aspects of the invention but are not intended to limit its scope. Where not otherwise specified throughout this specification and claims, temperatures are given in °C. and parts, percentages, and proportions are by weight.

EXAMPLE 1

This example illustrates the preparation of a heteric copolymer polyoxyalkylene fiber lubricant of the invention which is initiated utilizing a combination of bisphenol A (4,4'-isopropylidenediphenol) and diethylene glycol and containing ethylene oxide and propylene oxide residues which has been neutralized with salicylic acid.

A heteric copolymer polyoxyalkylene was prepared by adding 86 grams of 4,4-isopropylidenediphenol, 148 grams of diethylene glycol and 12 grams of a 45 percent by weight aqueous solution of potassium hydroxide to 61 grams of a mixture of 1 mole of 4,4'-isopropylidenediphenol and 7.6 moles of propylene oxide in a clean, dry, nitrogen-filled one-gallon autoclave equipped with temperature, pressure, and vacuum controls. The mixture was heated with agitation to 125° C. and then the autoclave was pressurized and purged with nitrogen. Water and volatiles were removed by stripping at 125° C. and 10 mm of pressure. The vacuum was relieved with nitrogen to 0.2 pounds per square inch gauge and a mixture of 1879 grams of propylene oxide and 626 grams of ethylene oxide were added at the rate of 300 to 400 grams per hour at a pressure of 9 pounds per square inch gauge and a temperature of 125° C. When addition was completed, the reaction mixture was allowed to react at constant pressure for 1 to 3 hours. The reaction mixture was then cooled to 80° C., the reactor vented, and the product discharged. The polyoxyalkylene product obtained was neutralized with salicylic acid to a pH of 6.7 and stripped at 450° C. and 10 mm of mercury. A clear, colorless mixture was obtained containing the potassium salt of salicyclic acid. The molecular weight of the product was 1,451, as derived from hydroxyl number which was determined to be 77.3.

EXAMPLE 2

Example 1 was repeated adding 0.25 percent by weight, based upon the weight of the polyoxyalkylene, of a commercial antioxidant sold under the trademark WINGSTAY L.

EXAMPLE 3

(Control—forming no part of this invention)

A polyoxyalkylene was prepared in accordance with the procedure of Example 1 except that the residual alkaline catalyst was not neutralized with salicylic acid but instead was removed by adsorption on magnesium silicate followed by filtration to remove both the magnesium silicate and the potassium ion.

EXAMPLE 4

A heteric copolymer polyoxyalkylene was prepared as follows: There was added to a clean, dry autoclave equipped with temperature, pressure, and vacuum controls 3200 grams of tetradecanol and 75 grams of a 45 percent by weight aqueous solution of potassium hydroxide. The autoclave was purged with nitrogen and pressure checked and then evacuated to less than 10 mm mercury while heating to 105° C. The mixture was stripped at 105° C. for 1 hour and then a mixture of 8,300 grams of ethylene oxide and 8,300 grams of propylene oxide were added over a 9 hour period at a temperature of 125° C. The product was cooled to 80° C. and the reactor discharged. The heteric copolymer polyoxyalkylene obtained was neutralized to a pH of 6.7 with salicylic acid to obtain a clear, colorless mixture of the potassium salt of salicylic acid and the polyoxyalkylene.

EXAMPLE 5

(Control—forming no part of this invention)

Example 4 was repeated but instead of neutralizing with salicylic acid, the polyoxyalkylene was neutralized with benzoic acid to a pH of 6.7. An insoluble precipitate was formed.

EXAMPLE 6

(Control—forming no part of this invention)

The polyoxyalkylene prepared in Example 4 was neutralized with acetic acid instead of salicylic acid. An insoluble precipitate was formed.

EXAMPLE 7

(Control—forming no part of this invention)

The polyoxyalkylene prepared in Example 4 was neutralized with para-hydroxy benzoic acid instead of salicylic acid. An insoluble precipitate was formed.

EXAMPLE 8

(Control—forming no part of this invention)

Example 6 was repeated and there was thereafter added thereto 0.25 percent by weight, based upon the weight of the polyoxyalkylene, of a commercial antioxidant sold under the trademark WINGSTAY L.

EXAMPLE 9

A block copolymer polyoxyalkylene was prepared by adding to a clean, dry autoclave equipped with temperature, pressure, and vacuum controls 600 grams of diethylene glycol and 120 grams of a 45 percent aqueous solution of potassium hydroxide. The autoclave was purged with nitrogen and pressure checked and then evacuated to less than 10 mm of mercury while heating to 125° C. The reactor contents were stripped for 1 hour at 125° C. and then the reactor was pressurized to 35 pounds per square inch gauge with nitrogen. Thereafter, 4,300 grams of ethylene oxide were added over a 1 hour period followed by 15,000 grams of propylene oxide over a 9 hour period. The product obtained was cooled to 80° C. and the reactor discharged. A 200 gram portion of the block copolymer obtained containing 0.01 mole of potassium hydroxide was neutralized with 0.01 mole of salicylic acid. The salicylic acid was dissolved in the product by heating the mixture to about 40° C. and stirring the mixture for 30 minutes. A clear, colorless solution was obtained.

EXAMPLE 10

To a 200 gram portion of the block copolymer obtained prior to neutralization in Example 9, there was added 0.01 mole of acetylsalicylic acid instead of the salicylic acid utilized in Example 9. A clear, colorless mixture was obtained containing the potassium salt of acetylsalicylic acid and the block copolymer polyoxyalkylene.

EXAMPLE 11

To a 200 gram sample of the block copolymer polyoxyalkylene obtained in Example 9 prior to neutralization, there was added 0.01 moles of ortho-hydroxy cinnamic acid to neutralize the 0.01 mole of potassium hydroxide present. A clear, colorless solution of the potassium salt of ortho-hydroxy cinnamic acid and the block copolymer polyoxyalkylene was obtained.

EXAMPLE 12

(Control—forming no part of this invention)

To a 200 gram portion of the block copolymer polyoxyalkylene obtained in Example 9 (prior to neutralization with salicylic acid) there was added 0.01 mole of metahydroxybenzoic acid to neutralize the 0.01 mole of potassium hydroxide present. An insoluble precipitate was formed.

The heat stability of certain of the neutralized polyoxyalkylenes in the above examples was compared with the heat stability of the same polyoxyalkylene from which potassium ion has been removed in a conventional manner utilizing magnesium silicate and filtration. Results are shown in the following Table I.

The water solubility and color subsequent to heating at 240° C. for 8 hours of certain of the polyoxyalkylenes shown in the above examples is shown in Table II.

TABLE I

Heat Stability of Polyoxyalkylene at 240° C.

| Example No. | Acid used to Neutralize Catalyst | % Residue after Heating | | |
|---|---|---|---|---|
| | | 4 Hours | 8 Hours | 24 Hours |
| 1 | Salicylic | 83.8 | 75.9 | 49.6 |
| 2 | Salicylic | 87.9 | 78.2 | 56.8 |
| 3 | None | 58.5 | 33.6 | 14.1 |

TABLE II

Water solubility and color of polyoxyalkylene heated at 240° C. for 8 hours.

| Example No. | Gardner Color | Estimated Water Solubility (%) Weight |
|---|---|---|
| 4 | 16 | 100 |
| 5 | 11 | 100 |
| 6 | 18 | 80 |
| 7 | 18 | 50 |
| 8 | 18 | 80 |

EXAMPLE 13

(Control—forming no part of this invention)

A flexible polyurethane foam was prepared by mixing the following ingredients in a plastic container using an electric stirrer. A graft copolymer dispersion in a polyol having a hydroxyl number of 26 and a vinyl polymer content of 20 percent by weight was prepared by the in situ polymerization of a mixture of styrene and acrylonitrile in a polyol. Said polyol is prepared by the sequential addition of a mixture of propylene oxide, allyl glycidyl ether, and ethylene oxide to glycerol as an initiator. Said graft copolymer dispersion 200 parts by weight, water 6 milliliters, triethylene diamine 1.4 milliliters, and an oxyalkylated silicone based surfactant sold under the trade designation DC-5043 by the Dow Corning Corporation in the amount of 4 milliliters were added to said container. The mixture was stirred for 30 seconds and then allowed to stand 15 seconds to promote deairation. Next, an 80/20 by weight mixture of toluene diisocyanate and polymethylene polyphenyl isocyanate, the toluene diisocyanate being an 80/20 by weight mixture respectively of 2,4-, 2,6-toluene diisocyanate, 75.6 grams were added and the mixture stirred an additional 5 seconds after which 160 grams of the mixture were transferred to an 83 ounce paper container in which foaming took place. The foam reached the top of the cup in 66 seconds, a total foam height of 209 millimeters and a total foam weight of 152.9 grams was obtained. The foam showed essentially no shrinkage, a smooth skin, and a light yellow color.

EXAMPLE 14

Example 13 is repeated except that the graft copolymer dispersion in a polyol utilized in the preparation of the foam was modified to include 0.25 parts per 100 parts of dispersion of potassium salicylate. Upon foaming, the mixture reached the top of the paper cup in 61 seconds and achieved a total foam height of 215 millimeters. The total foam weight was 153 grams. It was noted that the foam exhibited some shrinkage of the top portion of the foam, in addition, the foam appeared pock-marked at the top and had a light orange color. Upon exposing the inner portion of the foamed material by sawing through the central portion of the foamed material, it was noted that the foam exhibited some unevenness of the size of the pores which generally indicates that the reaction proceeded at too fast a rate.

EXAMPLE 15

(Control—foaming no part of this invention)

A rigid polyurethane composition was prepared by blending in a clean container 103 grams of a polyoxypropylene initiated using glycerol having an average molecular weight of about 300 with 94 grams of the 2-ethyl-hexanol adduct of an 80/20 mixture by weight respectively of 2,4- and 2,6-toluene diisocyanate. The mixture was degassed for approximately 3 minutes at a pressure of 10 millimeters of mercury and then the mixture was added to 130 grams of a polyurethane prepolymer prepared by reacting 3620 grams of an 80/20 by weight mixture of 2,4- and 2,6-toluene diisocyanate with 779 grams of a blend of 3856 grams of a polyoxypropylene adduct of glycerol having an average molecular weight of about 300 together with 429 grams of dipropylene glycol. After insuring that the above ingredients are thoroughly mixed, 0.25 cc of a stannous octoate catalyst, available as catalyst T-9 from M&T Corporation, is rapidly stirred into the mixture and then the mixture is poured into a polished aluminum mold. After 75 seconds from the time the catalyst was added, the mixture is set as indicated by hardening. After 2 minutes from the time the catalyst was added, a rigid, hard, clear polymer molding was obtained.

EXAMPLE 16

Example 15 is repeated except that the polyoxypropylene initiated with glycerol and having a molecular weight of about 300 contained 0.25 grams of potassium salicylate per 100 grams of polyoxypropylene. Equivalent rigid urethane compositions are obtained as compared to those obtained in Example 15.

EXAMPLE 17

(Control—forming no part of this invention)

A rigid polyurethane foam is prepared as follows: a mixture is prepared of 20 parts by weight of the 2-ethyl-hexanol adduct of an 80/20 mixture byweight respectively of 2,4- and 2,6-toluene diisocyanate, 20 parts with a polyoxypropylene initiated with pentaerythritol having a hydroxyl number of about 555, 100 parts by weight together with DABCO-33LV, 2.0 parts by weight, and Dow Corning DC-193 surfactant, 1.5 parts by weight. Polymethylene polyphenyl polyisocyanate, sold under the trademark PAPI by the Upjohn Company, 136.4 parts by weight, is separately combined with Freon 11 in the amount of 35 parts by weight and the above two mixtures are combined and poured into a mold. Blowing of the foam takes place as the heat of the reaction volatilizes the Freon 11. A rigid foam is produced.

EXAMPLE 18

Example 17 is repeated except that the polyoxypropylene adduct of pentaerythritol having a hydroxyl number of about 55 contains 0.25 parts of potassium salicylate per 100 parts of polyoxypropylene. Compara- ble rigid foams are produced as compared with those prepared in Example 17.

While this invention has been described with reference to certain specific embodiments, it will be recognized by those skilled in the art that many variations are possible without departing from the scope and spirit of the invention, and it will be understood that it is intended to cover all changes and modifications of the invention disclosed herein for the purposes of illustration which do not constitute departures from the spirit and scope of the invention.

The embodiments of the invention in which an exclusive property or privilege is claimed are defined as follows:

1. A polyurethane comprising the reaction product of at least one organic polyisocyanate with an organic compound containing at least two active hydrogen atoms as determined by the Zerewitinoff Method wherein said organic compound comprises at least one polyoxyalkylene containing an effective oxidation inhibiting amount of an alkali or alkaline earth metal salt of at least one acid having the formulas:

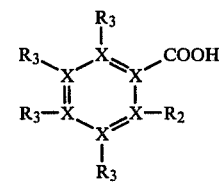

(I)

or

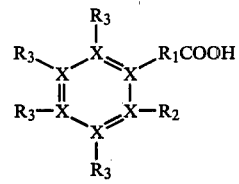

(II)

wherein $R_1$ is selected from the group consisting of alkyl and alkenyl of up to 6 carbon atoms; $R_2$ is selected from the group consisting of hydroxyl, an alkyl ether residue having up to 4 carbon atoms, an hydroxyalkyl ether residue having up to 4 carbon atoms, and an alkenoxy or oxyalkanoic acid ester residue having up to 18 carbon atoms, and benzoyl; $R_3$ is individually selected from the group consisting of hydrogen, an alkyl ether residue having up to 4 carbon atoms, an hydroxyalkyl ether having up to 4 carbon atoms, an alkyl or alkenyl group having up to 6 carbon atoms, halogen, and carboxyl groups; and X is selected from the group consisting of (1) carbon and (2) carbon together with at least one of nitrogen, sulfur, or oxygen.

2. The composition of claim 1 wherein said polyoxyalkylene comprises the reaction product derived from at least one alkylene oxide having up to 4 carbon atoms selected from the group consisting of ethylene oxide, 1,2-propylene oxide, butylene oxide and tetrahydrofuran prepared by polymerizing at least one of said oxides in the presence of an alkaline catalyst selected from the group consisting of at least one of an alkali metal hydroxide and an alkaline earth metal hydroxide.

3. The composition of claim 2 wherein said polyoxyalkylene is derived from the reaction of 1,2-propylene oxide with an initiator selected from the group consisting of at least one of trimethylolpropane, pentaerythritol, ethylene glycol, propylene glycol and wherein said polyoxyalkylene has a molecular weight of about 400 to about 12,500.

4. The composition of claim 3 wherein said acid is selected from the group consisting of at least one of salicylic acid, acetylsalicylic acid, and ortho-hydroxycinnamic acid and said polyoxyalkylene comprises a graft copolymer dispersion prepared by the in situ polymerization in the presence of a free radical catalyst at a temperature of from 70° C. to about 170° C. of (a) an ethylenically unsaturated monomer or mixture of said monomers in (b) an essentially saturated polyol or (c) an unsaturated polyol containing from 0.10 mole to 0.70 mole of unsaturation per mole of polyol.

5. The composition of claim 4 wherein said monomer is a mixture of acrylonitrile and styrene.

6. The composition of claim 5 wherein said polyurethane is a flexible foam polyurethane.

7. The composition of claim 1 wherein said polyurethane is a rigid foam polyurethane.

8. The polyurethane of claim 1 wherein said polyurethane is a non-cellular polyurethane.

* * * * *

UNITED STATES PATENT AND TRADEMARK OFFICE
CERTIFICATE OF CORRECTION

PATENT NO. : 4,468,478

DATED : August 28, 1984

INVENTOR(S) : Edward Michael Dexheimer et al

It is certified that error appears in the above-identified patent and that said Letters Patent is hereby corrected as shown below:

Column 1, line 12, delete "polyoxyalkalenes" and insert therefore ---polyoxyalkylenes---.

Column 2, lines 67 and 68, delete "polyoxyalklene" and insert therefor ---polyoxyalkylene---.

Column 3, lines 61-63, delete the clause "and X is selected from the group consisting of (1) carbon and (2) carbon together with at least one of nitrogen, sulfur and oxygen", and insert therefore ---and X is carbon.

Column 5, line 37, delete "accellerate" and insert therefor ---accelerate---.

Column 5, line 53, delete "provides" and insert therefor ---provide---.

Claim 1, line 53, delete "and X is selected from the group consisting of (1) carbon and (2) carbon together with at least one of nitrogen, sulfur, or oxygen", and insert therefor ---and X is carbon.

Signed and Sealed this

Nineteenth Day of March 1985

[SEAL]

Attest:

DONALD J. QUIGG

Attesting Officer

Acting Commissioner of Patents and Trademarks